United States Patent
Hasan et al.

(10) Patent No.: US 12,325,374 B2
(45) Date of Patent: **\*Jun. 10, 2025**

(54) METHODS AND SYSTEMS FOR GENERATING TRAINING AND EXECUTING A MODEL FOR DETECTING SAFETY SEAT EVENTS

(71) Applicant: BabyArk LTD, Hevel Modiln Industrial Park (IL)

(72) Inventors: Anan Hasan, Julis (IL); Shy Mindel, Hod-HaSharon (IL)

(73) Assignee: BabyArk LTD, Hevel Modiln Industrial Park (IL)

( \* ) Notice: Subject to any disclaimer, the term of this patent is extended or adjusted under 35 U.S.C. 154(b) by 0 days.

This patent is subject to a terminal disclaimer.

(21) Appl. No.: 18/610,311

(22) Filed: Mar. 20, 2024

(65) Prior Publication Data

US 2024/0217468 A1    Jul. 4, 2024

Related U.S. Application Data

(63) Continuation of application No. 17/774,153, filed as application No. PCT/IL2020/051147 on Nov. 4, 2020, now Pat. No. 11,964,623.

(Continued)

(51) Int. Cl.
*B60R 21/015* (2006.01)
*B60N 2/28* (2006.01)
(Continued)

(52) U.S. Cl.
CPC ...... *B60R 21/01556* (2014.10); *B60N 2/2806* (2013.01); *B60R 21/01542* (2014.10);
(Continued)

(58) Field of Classification Search
CPC ........ B60R 21/01556; B60R 21/01542; B60R 21/01566; B60N 2/002; G06N 3/04; H04W 4/12
See application file for complete search history.

(56) References Cited

U.S. PATENT DOCUMENTS

| 4,512,604 A | 4/1985 | Maeda et al. |
|---|---|---|
| D323,432 S | 1/1992 | Morton |

(Continued)

FOREIGN PATENT DOCUMENTS

| CN | 1976830 | 6/2007 |
|---|---|---|
| CN | 101786431 | 7/2010 |

(Continued)

OTHER PUBLICATIONS

English Summary Dated Feb. 27, 2024 of Notification of Office Action Dated Feb. 8, 2024 From the National Intellectual Property Administration of the People's Republic of China Re. Application No. 202080091578.6. (2 Pages).

(Continued)

*Primary Examiner* — Gertrude Arthur Jeanglaude

(57) ABSTRACT

There is provided a computer implemented method for executing a model, for detecting safety seat events, comprising: receiving a plurality of records, each represents measurements taken by a motion sensor mounted on a child safety seat or a base of a child safety seat installed in a vehicle while the vehicle is static or in motion; executing at least one model to classify each of the plurality of records; detecting an occurrence of a child related event based on outputs of the execution of the at least one model; and activating a protection mechanism by a protection mechanism unit according to the detected occurrence of child related event.

20 Claims, 4 Drawing Sheets

Related U.S. Application Data

(60) Provisional application No. 62/930,004, filed on Nov. 4, 2019.

(51) Int. Cl.
  *G06N 3/04* (2023.01)
  *H04W 4/12* (2009.01)
  *B60N 2/26* (2006.01)

(52) U.S. Cl.
  CPC ......... *B60R 21/01566* (2014.10); *G06N 3/04* (2013.01); *H04W 4/12* (2013.01); *B60N 2/268* (2023.08); *B60N 2/274* (2023.08)

(56) References Cited

U.S. PATENT DOCUMENTS

| | | |
|---|---|---|
| D339,477 S | 9/1993 | Kain |
| D366,965 S | 2/1996 | Meeker et al. |
| D373,028 S | 8/1996 | Kain |
| D374,558 S | 10/1996 | Kain |
| D383,912 S | 9/1997 | Meeker et al. |
| 5,685,603 A | 11/1997 | Lane, Jr. |
| 5,943,295 A * | 8/1999 | Varga .................. G06V 40/103 367/99 |
| 6,012,007 A | 1/2000 | Fortune et al. |
| D419,786 S | 2/2000 | Kain |
| 6,206,470 B1 | 3/2001 | Baloga et al. |
| D450,935 S | 11/2001 | Dranschak et al. |
| 6,393,348 B1 | 5/2002 | Ziegler et al. |
| 6,609,054 B2 | 8/2003 | Wallace |
| D484,941 S | 1/2004 | Johnson |
| D487,640 S | 3/2004 | Chen |
| 6,808,200 B2 | 10/2004 | Drobny et al. |
| 6,922,147 B1 | 7/2005 | Viksins et al. |
| 7,024,294 B2 | 4/2006 | Sullivan et al. |
| D524,560 S | 7/2006 | Berhow et al. |
| 7,288,009 B2 | 10/2007 | Lawrence et al. |
| D572,027 S | 7/2008 | Hui |
| 7,439,866 B2 | 10/2008 | Wallner et al. |
| 7,523,679 B2 | 4/2009 | Hawes et al. |
| D604,054 S | 11/2009 | Biaud |
| D621,171 S | 8/2010 | Xu |
| D629,218 S | 12/2010 | Li |
| D629,219 S | 12/2010 | Xu et al. |
| D629,220 S | 12/2010 | Xu et al. |
| 8,366,146 B2 | 2/2013 | Yamaki et al. |
| D680,764 S | 4/2013 | Chen |
| D683,974 S | 6/2013 | Leys et al. |
| D697,323 S | 1/2014 | Williams et al. |
| D702,052 S | 4/2014 | Wiegmann et al. |
| 8,816,845 B2 | 8/2014 | Hoover et al. |
| D737,061 S | 8/2015 | Daley et al. |
| 9,132,754 B2 | 9/2015 | Mindel et al. |
| D746,072 S | 12/2015 | Haley |
| 9,266,535 B2 | 2/2016 | Schoenberg et al. |
| D764,817 S | 8/2016 | Pos |
| D771,987 S | 11/2016 | Daley et al. |
| D778,627 S | 2/2017 | Stroikov |
| D824,182 S | 7/2018 | Williams et al. |
| 10,081,274 B2 | 9/2018 | Frank et al. |
| D841,346 S | 2/2019 | Huntley et al. |
| D851,948 S | 6/2019 | Imrich et al. |
| D859,861 S | 9/2019 | Kapanzhi |
| 10,723,245 B2 | 7/2020 | Anderson et al. |
| 11,560,073 B2 | 1/2023 | Pos |
| 11,964,623 B2 * | 4/2024 | Hasan ............... B60R 21/01556 |
| 2002/0175544 A1 | 11/2002 | Goor et al. |
| 2003/0155753 A1 * | 8/2003 | Breed .................... B60N 2/002 280/735 |
| 2004/0113797 A1 | 6/2004 | Osborne |
| 2005/0248136 A1 * | 11/2005 | Breed ................ B60R 21/0152 280/742 |
| 2006/0273640 A1 | 12/2006 | Kassai et al. |
| 2009/0152913 A1 | 6/2009 | Amesar et al. |
| 2010/0253498 A1 | 10/2010 | Rork et al. |
| 2012/0074758 A1 | 3/2012 | Gates et al. |
| 2013/0088057 A1 | 4/2013 | Szakelyhidi et al. |
| 2014/0239684 A1 | 8/2014 | Mindel et al. |
| 2014/0253313 A1 | 9/2014 | Schoenberg |
| 2014/0300155 A1 | 10/2014 | Lehman et al. |
| 2014/0354021 A1 | 12/2014 | Sedlack |
| 2017/0140634 A1 | 5/2017 | Mindel et al. |
| 2018/0099592 A1 | 4/2018 | Curry, V |
| 2018/0232638 A1 | 8/2018 | Lin et al. |
| 2018/0354443 A1 | 12/2018 | Ebrahimi et al. |
| 2019/0176739 A1 | 6/2019 | Song |
| 2019/0193590 A1 | 6/2019 | Labombarda et al. |
| 2019/0251820 A1 | 8/2019 | Friedman |
| 2021/0078461 A1 | 3/2021 | Ma et al. |
| 2022/0363168 A1 | 11/2022 | Hasan et al. |
| 2022/0371483 A1 | 11/2022 | Hasan et al. |
| 2022/0402452 A1 | 12/2022 | Hasan et al. |

FOREIGN PATENT DOCUMENTS

| | | |
|---|---|---|
| CN | 102015364 | 4/2011 |
| CN | 102189946 | 9/2011 |
| CN | 103042954 | 4/2013 |
| CN | 103879316 | 6/2014 |
| CN | 104024042 | 9/2014 |
| CN | 204327674 | 5/2015 |
| CN | 105620321 | 6/2016 |
| CN | 106627285 | 5/2017 |
| CN | 107662527 | 2/2018 |
| CN | 208498316 | 2/2019 |
| CN | 208576460 | 3/2019 |
| CN | 110116661 | 8/2019 |
| CN | 110126687 | 8/2019 |
| DE | 4446595 | 10/1995 |
| DE | 102008027829 | 12/2009 |
| DE | 102017126431 | 5/2019 |
| EP | 2269861 | 1/2011 |
| EP | 2746097 | 6/2014 |
| GB | 2490414 | 10/2012 |
| JP | 2009-274492 | 11/2009 |
| JP | 2010-284992 | 12/2010 |
| WO | WO 2013/046200 | 4/2013 |
| WO | WO 2017/029272 | 2/2017 |
| WO | WO 2019/091916 | 5/2019 |
| WO | WO 2021/090313 | 5/2021 |
| WO | WO 2021/090315 | 5/2021 |
| WO | WO 2021/090316 | 5/2021 |
| WO | WO 2021/090318 | 5/2021 |
| WO | WO 2018/054249 | 8/2021 |

OTHER PUBLICATIONS

International Preliminary Report on Patentability Dated May 19, 2022 From the International Bureau of WIPO Re. Application No. PCT/IL2020/051142. (10 Pages).

International Preliminary Report on Patentability Dated May 19, 2022 From the International Bureau of WIPO Re. Application No. PCT/IL2020/051146. (8 Pages).

International Preliminary Report on Patentability Dated May 19, 2022 From the International Bureau of WIPO Re. Application No. PCT/IL2020/051147. (10 Pages).

International Preliminary Report on Patentability Dated May 19, 2022 From the International Bureau of WIPO Re. Application No. PCT/IL2020/051149. (10 Pages).

International Search Report and the Written Opinion Dated Feb. 7, 2021 From the International Searching Authority Re. Application No. PCT/IL2020/051146. (10 Pages).

International Search Report and the Written Opinion Dated Apr. 12, 2021 From the International Searching Authority Re. Application No. PCT/IL2020/051142. (16 Pages).

International Search Report and the Written Opinion Dated Feb. 17, 2021 From the International Searching Authority Re. Application No. PCT/IL2020/051149. (17 Pages).

International Search Report and the Written Opinion Dated Mar. 25, 2021 From the International Searching Authority Re. Application No. PCT/IL2020/051147. (11 Pages).

(56) References Cited

OTHER PUBLICATIONS

Invitation to Pay Additional Fees and Communication Relating to the Results of the Partial International Search Dated Feb. 23, 2021 From the International Searching Authority Re. Application No. PCT/IL2020/051142. (4 Pages).
Machine Translation Dated Feb. 22, 2024 of Notification of Office Action and Search Report Dated Feb. 8, 2024 From the National Intellectual Property Administration of the People's Republic of China Re. Application No. 202080091578.6. (10 Pages).
Notice of Allowability Dated Jul. 8, 2021 from the US Patent and Trademark Office Re. U.S. Appl. No. 29/713,766. (4 pages).
Notice of Allowance Dated Nov. 20, 2023 from the US Patent and Trademark Office Re. U.S. Appl. No. 17/774,153. (3 pages).
Notice of Allowance Dated Oct. 22, 2021 from the US Patent and Trademark Office Re. U.S. Appl. No. 29/712,626. (27 pages).
Notice of Allowance Dated Apr. 23, 2021 from the US Patent and Trademark Office Re. U.S. Appl. No. 29/716,766. (19 pages).
Notification of Office Action and Search Report Dated Feb. 8, 2024 From the National Intellectual Property Administration of the People's Republic of China Re. Application No. 202080091578.6. (9 Pages).
Notification of Office Action and Search Report Dated Jan. 22, 2024 From the State Intellectual Property Office of the People's Republic of China Re. Application No. 202080091573.3 and its Machine Translation of Office Action Into English as well as an English summary. ( 17 Pages).
Notification of Office Action and Search Report Dated Feb. 27, 2024 From the State Intellectual Property Office of the People's Republic of China Re. Application No. 202080091585.6 and its Machine Translation Into English. (27 Pages).
Notification of Office Action Dated Jul. 6, 2020 From the China National Intellectual Property Administration Re. Application No. 201930604505.2. (1 Page).
Notification of Office Action Dated Apr. 13, 2020 From the China National Intellectual Property Administration Re. Application No. 201930604505.2. (2 Pages).
Office Action Dated Oct. 26, 2020 From the Israel Patent Office Re. Application No. 65010. (2 Pages).
Office Action Dated Oct. 29, 2020 From the Israel Patent Office Re. Application No. 65009. (2 Pages).
Official Action Dated Jun. 1, 2023 from the US Patent and Trademark Office Re. U.S. Appl. No. 17/774,153. (22 pages).
Official Action Dated Nov. 16, 2023 from the US Patent and Trademark Office Re. U.S. Appl. No. 17/774,176. (27 pages).
Restriction Official Action Dated Jan. 25, 2024 from the US Patent and Trademark Office Re. U.S. Appl. No. 17/774,172. (6 pages).
Supplementary European Search Report and the European Search Opinion Dated Dec. 13, 2023 From the European Patent Office Re. Application No. 20884278.1. (8 Pages).
Supplementary European Search Report and the European Search Opinion Dated Nov. 15, 2023 From the European Patent Office Re. Application No. 20885576.7. (10 Pages).
Supplementary European Search Report and the European Search Opinion Dated Nov. 17, 2023 From the European Patent Office Re. Application No. 20885648.4. (7 Pages).
Supplementary Partial European Search Report and the European Provisional Opinion Dated Dec. 5, 2023 From the European Patent Office Re. Application No. 20885873.8. (12 Pages).
Technical Requirement Dated Sep. 7, 2020 From the Servico Publico Federal, Ministerio da Economia, Instituto Nacional da Propriedade Industrial do Brasil Re. Application No. BR302020002169-0 and Its Translation Into English. (16 Pages).
BeSafe "BeSafe iZi Modular i-Size Installation", BeSafe—Scandinavian Safety, Screen Capture From YouTube Video Clip, 1 P., Feb. 9, 2016.
BeSafe "iZi Modular™M i-Size—User Manual", BeSafe® Scandinavian Safety, UN Regulation No. R129, p. 1-98, May 18, 2017.
BeSafe "SIP+—Additional Side Impact Protection", BeSafe® Scandinavian Safety, p. 1-4, 2019.
BeSafe "Toddler Car Seat—iZi Modular i-Size Concept", BeSafe® Scandinavian Safety, Product Description, p. 1-7, 2019.
Britax "Britax Roemer Baby-Safe i-Size Review", Pushchair Expert, Product Description, p. 1-10, Dec. 21, 2016.
Jollyroom "Cybex Sirona M2 i-Size Instructionvideo", Screen Capture From YouTube Video Clip, 1 P., Mar. 23, 2017.
Maxi-Cosi "Maxi-Cosi—How to Install the AxissFix Car Seat in Your Car", Screen Capture From YouTube Video Clip, 1 P., Dec. 12, 2014.
Maxi-Cosi "The New Pebble Plus", Screen Capture From YouTube Video Clip, 1 P., Oct. 10, 2014.
Smyths Toys Superstore "Smyth Toys—Doona ISOfix Base Black", Screen Capture From YouTube Video Clip, 1 P., Apr. 14, 2017.
Notification of Office Action Dated Jul. 16, 2024 From the State Intellectual Property Office of the People's Republic of China Re. Application No. 202080091585.6. (4 Pages).
Translation and Summary Dated Jul. 29, 2024 of Notification of Office Action Dated Jul. 16, 2024 From the State Intellectual Property Office of the People's Republic of China Re. Application No. 202080091585.6. (4 Pages).
Restriction Official Action Dated Apr. 26, 2024 from the US Patent and Trademark Office Re. U.S. Appl. No. 17/774,181. (6 pages).
Official Action Dated Aug. 29, 2024 from the US Patent and Trademark Office Re. U.S. Appl. No. 17/774,172. (44 pages).
Supplementary European Search Report and the European Search Opinion Dated May 15, 2024 From the European Patent Office Re. Application No. 20885873.8. (13 Pages).
Notice of Allowance Dated Jun. 21, 2024 from the US Patent and Trademark Office Re. U.S. Appl. No. 17/774,176. (29 pages).
Official Action Dated Oct. 1, 2024 from the US Patent and Trademark Office Re. U.S. Appl. No. 17/774,181. (35 pages).
Notification of Office Action Dated Oct. 14, 2024 From the State Intellectual Property Office of the People's Republic of China Re. Application No. 202080091578.6 and its Machine Translation together with an Engluish Summary. (17 Pages).

* cited by examiner

METHODS AND SYSTEMS FOR GENERATING TRAINING AND EXECUTING A MODEL FOR DETECTING SAFETY SEAT EVENTS

RELATED APPLICATIONS

This application is a Continuation of U.S. patent application Ser. No. 17/774,153, filed on May 4, 2022, now U.S. Pat. No. 11,964,623, which is a National Phase of PCT Patent Application No. PCT/IL2020/051147 having International Filing Date of Nov. 4, 2020, which claims the benefit of priority under 35 USC § 119 (e) of U.S. Provisional Patent Application No. 62/930,004 filed on Nov. 4, 2019.

PCT Patent Application No. PCT/IL2020/051147 is also related to co-filed PCT Patent Application No. PCT/IL2020/051146 entitled "METHODS AND SYSTEMS FOR SAFETY SEAT".

The contents of the above applications are all incorporated by reference as if fully set forth herein in their entirety.

FIELD AND BACKGROUND OF THE INVENTION

The present invention, in some embodiments thereof, relates to a machine learning model for a safety seat, and more specifically, but not exclusively, for detecting a child event in a safety seat.

In the past, children were not protected by any means during driving. This lack of protection turned out to be fatal for the infants which got into accidents. Since children are small and fragile, they suffered from various injuries and death case as a result of the accidents and car collision. Today, to prevent or at least to minor death cases and injuries, safety seats are used and provide the children passive restraints.

SUMMARY OF THE INVENTION

According to a first aspect, a computer implemented method for generating a model for detecting safety seat events, comprising: receiving a plurality of records, each represents measurements taken by a motion sensor mounted on a child safety seat or a base of a child safety seat installed in a vehicle while the vehicle is static or in motion, each of the measurements is associated with a child related event; training at least one model with the plurality of records; outputting the at least one model for detecting an occurrence of child related events based on new measurements taken by another motion sensor installed on another child safety seat or another base of another child safety seat.

According to a second aspect, a computer implemented method for executing a model, for detecting safety seat events, comprising: receiving a plurality of records, each represents measurements taken by a motion sensor mounted on a child safety seat or a base of a child safety seat installed in a vehicle while the vehicle is static or in motion; executing at least one model to classify each of the plurality of records; detecting an occurrence of a child related event based on outputs of the execution of the at least one model; and activating a protection mechanism by a protection mechanism unit according to the detected occurrence of child related event.

According to a third aspect, a system for generating a model for detecting safety seat events, comprising: at least one processor executing a code for: receiving input of a plurality of records each represents measurements associated with a child related event, from a motion sensor mounted on a child safety seat or a base of a child safety seat installed in a vehicle, while the vehicle is static or in motion; training at least one model based on the plurality of records; and outputting the at least one model for detecting an occurrence of child related events based on new measurements taken by another motion sensor installed on another base of another child safety seat.

According to a fourth aspect, a system for executing a model for detecting safety seat events, comprising: at least one processor executing a code for: receiving a plurality of records, each represents measurements received from a motion sensor mounted on a child safety seat or a base of a child safety seat installed in a vehicle while the vehicle is static or in motion; executing at least one model to classify each of the plurality of records; detecting an occurrence of a child related event based on outputs of the execution of the at least one model; and activating a protection mechanism by a protection mechanism unit according to the detected occurrence of child related event.

In a further implementation of the first, second, third and fourth aspects, each of the measurements is associated with vehicle driving condition measurements of the vehicle while the vehicle is in motion.

In a further implementation of the first, second, third and fourth aspects, each of the measurements is associated with vehicle driving pattern measurements of the vehicle while the vehicle is in motion.

In a further implementation of the first, second, third and fourth aspects, the motion sensor is a member of a group consisting of: an accelerometer and a gyroscope.

In a further implementation of the first, second, third and fourth aspects, the computer implemented method for executing a model, for detecting safety seat events, further comprising presenting a notification about the occurrence of the child related event while the vehicle is in motion.

In a further implementation of the first, second, third and fourth aspects, the computer implemented method for executing a model, for detecting safety seat events, further comprising detecting the driving pattern of the vehicle, based on the motion sensor mounted on the safety seat or the base of the safety seat and adjusting the protection mechanism to the detected driving pattern according to the detected occurrence of child related event.

In a further implementation of the first, second, third and fourth aspects, the child related event is selected from a group consisting of: a presence of a child in the safety seat, a sleeping child, an awake child, a crying child, a relaxed child, an unquite child, an uncomfortable child and an absence of a child in the safety seat.

In a further implementation of the first, second, third and fourth aspects, when the child related event is a child presence in the safety seat, a child activity level is detected.

In a further implementation of the first, second, third and fourth aspects, when the child related event is the child presence in the safety seat while the vehicle is static for a period longer than a predetermined threshold, an alert indication is activated by the protection mechanism unit.

In a further implementation of the first, second, third and fourth aspects, the alert indication is a light indication or a sound indication.

In a further implementation of the first, second, third and fourth aspects, the computer implemented method for executing a model, for detecting safety seat events, further comprising analyzing an installation process of the safety seat or of the base of the safety seat based on the motion sensor and notifying when the installation is wrong.

In a further implementation of the first, second, third and fourth aspects, the protection mechanism is selected from a group consisting of: an alert to a driver of the vehicle, an air bag of the vehicle and tighten seat belt of the safety seat.

In a further implementation of the first, second, third and fourth aspects, when the protection mechanism is the air bag of the vehicle, said air bag is adjusted to a size, weight and age of the child.

In a further implementation of the first, second, third and fourth aspects, when the safety seat is connected to a cellular phone, a dedicated phone application sends an alert notification to the connected cellular phone, as a text message or as a voice message or as an incoming call.

In a further implementation of the first, second, third and fourth aspects, the model is using CNN architecture.

In a further implementation of the first, second, third and fourth aspects, the model is using RNN architecture.

In a further implementation of the first, second, third and fourth aspects, the computer implemented method for executing a model, for detecting safety seat events, further comprising identifying an accident situation according to the model output and notifying the driver of the vehicle of said identified accident situation.

In a further implementation of the first, second, third and fourth aspects, when an accident situation is identified and the safety seat or the base of the safety seat is connected to a cellular phone, a dedicated phone application sends a notification to the connected cellular phone, about the accident.

In a further implementation of the first, second, third and fourth aspects, the computer implemented method for executing a model, for detecting safety seat events, further comprising identifying the safety seat must be replaced, by detecting a separation of at least 2 mm, of two parts of the base of the safety seat, which are linked together by an energy absorption element, and notifying the driver of the vehicle that said safety seat must be replaced.

In a further implementation of the first, second, third and fourth aspects, the notification to the driver of the vehicle that the safety seat must be replaced is a light or sound indication.

In a further implementation of the first, second, third and fourth aspects, the executing the model is done on a local processor located at the child safety seat or at the base of the child safety seat.

In a further implementation of the first, second, third and fourth aspects, executing the model is done on a remote processor located at a mobile device.

In a further implementation of the first, second, third and fourth aspects, executing the model is done on a computing cloud.

In a further implementation of the first, second, third and fourth aspects, executing the model is done partially on a local processor located at the child safety seat or on the base of the child safety seat and partially on a computing cloud, or partially on remote processor located at a mobile device.

In a further implementation of the third and fourth aspects, the motion sensor is mounted on an infant carrying device.

In a further implementation of the third and fourth aspects, the infant carrying device is one of the following: a crib, a rocking chair, a stroller and a perambulator.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION OF EMBODIMENTS OF THE INVENTION

Figure 1:
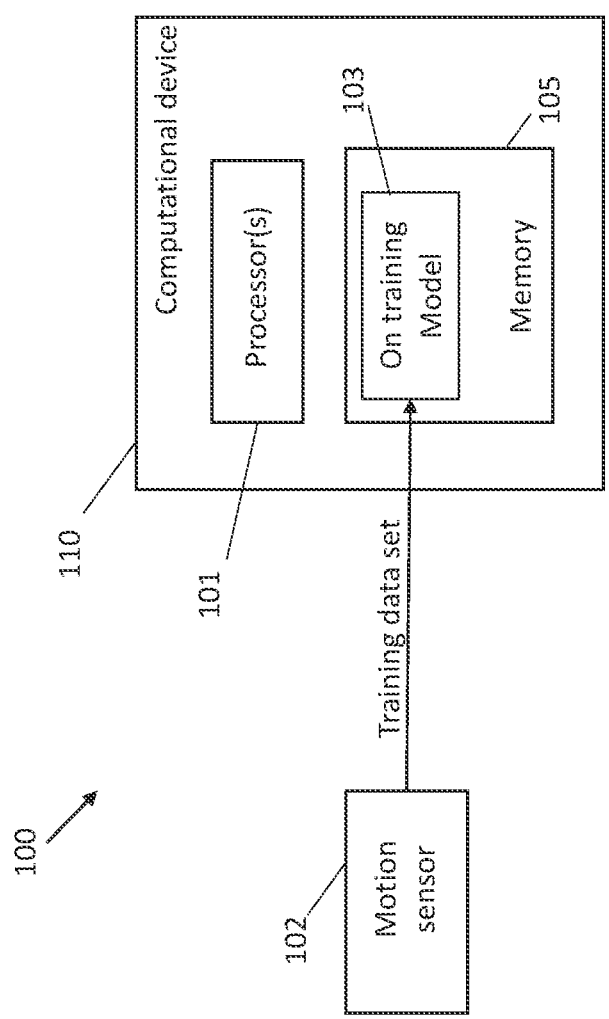
FIG. 1 schematically shows a block diagram of a system for training a model for detecting safety seat events, according to one or more embodiments of the present invention.

The present invention, in some embodiments thereof, relates to a machine learning model and more specifically, but not exclusively, a model for detecting safety seat events and for the training of such a model.

Safety seats existing in the market are typically simple seats with seatbelts, which provide basic protection of passive restraints to the child carried in the safety seat, and should therefore be used correctly. However, in many cases, due to lack of awareness, the safety seat is not used correctly and children are not properly protected. In other cases, children may be exposed to dangers, even life threatening dangers while being in a vehicle, which can sometimes be solved easily, by the attention of an adult, and which the existed safety seats do not protect from. For example: in case of forgetting children in a vehicle, an unbuckled child in the safety seat and so on. Moreover, in some cases different vehicles have different driving patterns to which the safety seats are not adjusted. Therefore, there is a need to provide a smart safety seat which can detect safety seat events, and child related event, to notify an adult and in some cases to activate a protection mechanism to better protect the child in the safety seat. Moreover, there is a need to provide a smart safety seat, which can learn the driving pattern of the vehicle, and adjust the protection mechanism to the driving pattern of the vehicle, according to the detected child related event.

One of the benefits using a machine learning model in the invention, lays in the fact that the model is not rule based. Therefore, it can provide solutions to undefined situations. For example: in a rule based model there is a solution to discrete cases were according to a received value or range of values in the input measurements the rule based model provides a solution. However, in a machine learning model such as the one of the invention, it is not rule based, but based on a very large number of measurements. The measurements may be spatio-temporal so that the machine learning model may recognize pattern along time of a situation, and provide a solution for the situation. The measurements may be discrete, spatial measurements or spatio-temporal measurements. For example, spatial discrete measurements may be a measured acceleration of 1G at a defined time t1. However, it may also be a pattern such as: 1G, 2G, 3G, 1G, 2G, 3G, where a series of values are detected or 1G, 4G, 5G, 4G, 3G, 4G, where the value 4G repeats every second time or any other pattern of measurements. Another example for the benefit of a machine learning based model vs a rule based model may be of the fact the model executed for every seat is different. For instance, the model is influenced from the vehicle specific, the child and the environment and therefore the model of the invention executed in two different vehicles, with two different children provides different outputs and different solutions.

An aspect of some embodiments of the present invention relates to systems, methods, an apparatus, and/or code instructions (i.e., stored on a memory and executable by one or more hardware processors) for detecting safety seat events and providing a solution to better protect the child in the safety seat. Input records which taken by a motion sensor mounted on a safety seat or on a base of a safety seat are fed into a model, which outputs an indication of an occurrence of a child related event detected. Thereby activating a protection mechanism by a protection mechanism unit to better protect the child in the safety seat.

An aspect of some embodiments of the present invention relates to systems, methods, an apparatus, and/or code instructions (e.g., stored in a memory and/or data storage device and executable by one or more hardware processors) for training a model for detecting safety seat events. A set of training inputs, consisting of a plurality of records each represents measurements, taken by motion sensors mounted on a child safety seat or on a base of a child safety seat, installed in a vehicle, while the vehicle is in motion, is provided. Each of the measurements is associated with a child related event.

The model is trained using the training set to identify a child related event. The model is provided to process new measurements taken by new motion sensors mounted on a new child safety seat or a new base of a child safety seat. An indication of a child related event is generated when the model outputs an indication that a child related event occurrence was detected.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a block diagram of components of a system 100 for training a model for detecting safety seat event, in accordance with some embodiments of the present invention. System 100 includes a computational device 110, which contains one or more processors 101 and an on training model 103, which is hold in memory 105. The one or more processors 101 executes the training of the on training model 103. The training of the model is done off-line as a preparation for the execution of the trained model in real-time. The on training model receives a dataset or a labeled dataset that includes a plurality of records. Each of the records represents measurements of one or more motion sensors 102. The measurements are acquired form the motion sensors, while a vehicle hosting the child safety seat or the base of the child safety seat is static or on a move. The measurements may be discrete, spatial measurements or spatio-temporal measurements. For example, spatial discrete measurements may be a measured acceleration of 1G at a defined time t1. However it may also be a pattern such as: 1G, 2G, 3G, 1G, 2G, 3G, where a series of values are detected or 1G, 4G, 5G, 4G. 3G, 4G, where the value 4G repeats every second time or any other pattern of measurements. The records are used for training on training model 103, for instance based on machine learning paradigm. The trained model is designed for detecting or predicting a child related event based on new measurements from other motion sensors, while a vehicle hosting the respective child safety seat or base is static or on a move.

According to some embodiments of the present invention, the motion sensors may also be mounted on an infant carrying device such as cribs, rocking chairs, strollers perambulator (prams) and the like, to acquire measurements for the on training model to generate a child related event. An example for a child related event may be a presence or an absence of a child in the safety seat, a sleepiness state of a child, an awakeness state of a child, a crying child, a relaxed child, an unquite child, an uncomfortable child and so on. Also, in some embodiments of the invention, in an awakeness state of a child in the safety seat the on training model is trained to detect what is the activity level of the child. For example: a calm state of a child is detected as a low level activity and a wild state of a child is detected as a high activity level.

In some embodiments of the present invention, the measurements for the training dataset are also classified and associated with driving conditions of the vehicle, and are used to train the on training model 103 to detect the driving condition of the vehicle. Examples for driving conditions may be urban conditions, highway or field conditions.

In some embodiments of the invention, motion sensors 102, mounted on the safety seat or on the base of the safety seat may be an accelerometer or a gyroscope or any other motion sensor. In some other embodiments of the invention the on training model 103 is trained to detect an accident situation, based on records received from motion sensors 202, when the vehicle is on a move.

In some embodiments of the present invention, the measurements for the training dataset are also classified and associated with driving pattern of the vehicle that the safety seat is installed in. The driving pattern measurements are used to train the on training model 103 to detect the driving pattern of the vehicle, while the vehicle is in motion, to adjust the protection mechanism to the detected driving pattern.

Figure 2:
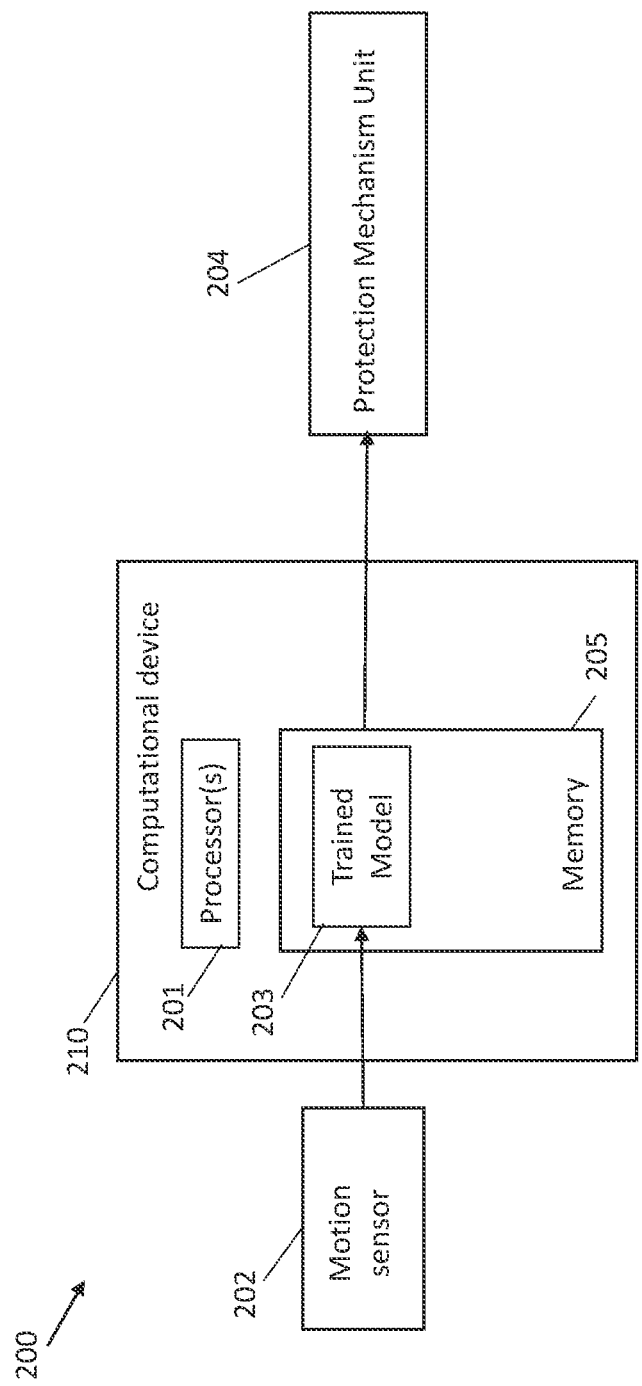
FIG. 2 schematically shows a block diagram of a system for detecting safety seat events, according to one or more embodiments of the present invention.

Reference is now made to FIG. 2 which is a block diagram of components of a system 200 for detecting a safety seat event, in accordance with some embodiments of the present invention. System 200 includes a computational device 210 with one or more processors 201 and a memory 205, which hold a trained model 203. The trained model 203 receives a plurality of records, which are not labeled. Each record represents measurements from one or more motion sensors 202. The motion sensors are mounted on a safety seat or on a base of a safety seat, which is installed in a vehicle. The measurements are acquired while the vehicle is static or moving. The one or more processors 201, execute the trained model 203, in real time to classify each of the plurality of received records. Thereby, the trained model detects the occurrence of a child related event. In some embodiments of the invention, the execution of the trained model may be on a local processor located on the safety seat or on the base of the safety seat. Alternatively, the execution may be on a remote server, a computing cloud a dedicated phone application or any combination thereof. A child related event may be for example the presence or absence of a child in the safety seat, a sleepiness state of a child and awakeness state of a child in the safety seat, a crying child, a relaxed child, an unquite child, an uncomfortable child and a child that is left unattended for a long period of time (for a period longer than a predetermined threshold) in a static vehicle. Once a child related event is detected, processors 201 activates a protection mechanism unit 204, which operates a protection mechanism according to the detected child event, for protecting the child in the safety seat accordingly.

In some of the embodiments of the invention, execution of the trained model 203 classifies the received records also with driving condition of the vehicle, while the vehicle is in motion. For example: the vehicle is in motion in an urban environment, highway or field environment. In some other embodiments of the invention the trained model 203, detects when the vehicle is in a parking situation, based on records received from motion sensors 202, when the vehicle is not on a move.

In some other embodiments of the invention the trained model detects an accident situation, based on records received from motion sensors 202, when the vehicle is on a move.

The trained model 203, indicates a detected child event to processors 201, which activates the protection mechanism unit 204. The protection mechanism unit according to the detected child related event, provides a solution of a suitable protection mechanism to the detected event. A protection mechanism may be for example: an alert indication and/or notification to the driver of the vehicle, an air bag of the vehicle, tighten the seat belt of the safety seat or any other suitable protection mechanism. For example: when the vehicle is in parking situation and a presence of a child is detected in the safety seat, an indication such as a light indication or a sound indication is activated and/or a notification is sent to the driver of the vehicle to avoid forgetting a child in the vehicle.

In some embodiments of the invention, the indication provided to the driver when a child related event is detected may be a light indication or a sound indication. In addition, the safety seat of system 200 may be connected to a cellular phone, and then, a notification about the child related event is sent to the connected cellular phone. The notification may be sent for example, as a text message, a voice message or as an incoming call.

In some embodiments of the invention, motion sensors 202, mounted on the safety seat or on the base of the safety seat may be an accelerometer or a gyroscope or any other motion sensor.

According to some embodiments of the present invention, the motion sensors may also be mounted on an infant carrying device such as cribs, rocking chairs, strollers perambulators (prams) and the like, to acquire measurements for the trained model to generate a child related event.

In some other embodiment of the invention, the trained model 203, detects when the installation of the safety seat in the vehicle is wrong, based on the motion sensors 202, and provides an indication and/or a notification for the wrong installation.

In some embodiments of the present invention, the trained model 203, detects the driving pattern of the vehicle that the safety seat is installed in, while the vehicle is in motion, and adjust the protection mechanism to the detected driving pattern.

In some embodiments of the invention, one of the child related events that are detected by the trained model 203 is an accident situation. When an accident situation is detected, the safety seat may be harmed, so it has to be replaced with a new safety seat. The trained model of the invention identifies the accident situation, and notifies the driver of the vehicle about the accident situation identified. The trained model of the invention also identifies if there is a presence of a child in the safety seat, and when there is a child presence, the processor 201 may activate a protection mechanism by the protection mechanism unit 204, to protect the child. In some embodiments of the invention, the trained model 203 detects an accident according to a predefined threshold of an abnormal acceleration detection of between 3G and 30G. Usually, when the acceleration is not more than 6G, the safety seat is not harmed and there is no separation of the base and therefore the seat does not need to be replaced (Of course, this also depends of the presence of the child as the dynamic mass changes). In this case an indication and/or notification about the accident is provided to the driver of the vehicle, notifying the safety seat does not need to be replaced. In some other embodiments, the trained model 203, of the invention identifies an accident where the safety seat must be replaced, according to an acceleration detected of above 6G. The system notifies the driver of the vehicle about the accident and indicates that the safety seat must be replaced accordingly.

In some embodiments of the invention, the indication and/or notification provided to the driver when the safety seat must be replaced may be a light indication and/or a sound indication or any other indication.

In some embodiments of the invention, when an accident situation is detected, another case where the trained model 203 identifies that the safety seat must be replaced is when a separation of the safety seat or of the base of the safety seat is detected. The separation is detected based on a separation sensor mounted on the safety seat or on the base of the safety seat. Examples for a separation sensor may be a hall sensor and a magnet, a micro-switch, a fuse or any other method, for detecting the separation. A mechanical detection is used to detect a separation of at least 2 mm, of two parts of the base of the safety seat, which are linked together by an energy absorption element. Once the separation is detected, the system notifies the driver of the vehicle that the safety seat must be replaced.

In some embodiments of the invention, the safety seat may be connected to a cellular phone. In case the seat is connected to a cellular phone, and an accident situation is identified, a dedicated phone application is activated and sends a notification about the accident to the connected cellular phone.

In some embodiments of the invention, when the system identifies an accident situation the protection mechanism unit activates a protection mechanism of an air bag. The air bag is adjusted to the size, weight and age of the child.

In some embodiments of the invention, the accident forces and vectors are measured during the whole impact in order to understand how the safety seat is absorbing the forces when protecting the child. Also, it is detected how the safety seat is moving in relation to the vehicle and in relation to the vehicle interior elements.

In some embodiments of the invention the classification of each of the plurality of records is done on a local processor located at the child safety seat or at the base of the child safety seat. Alternatively, the classification of each of the plurality of records may take place at a remote processor located at a mobile device. In some other embodiments, the classification of each of the plurality of records is done on a computing cloud or alternatively, the classification of each of the plurality of records is done partially on a local processor located at the child safety seat or on the base of the child safety seat and partially on a computing cloud.

Figure 3:
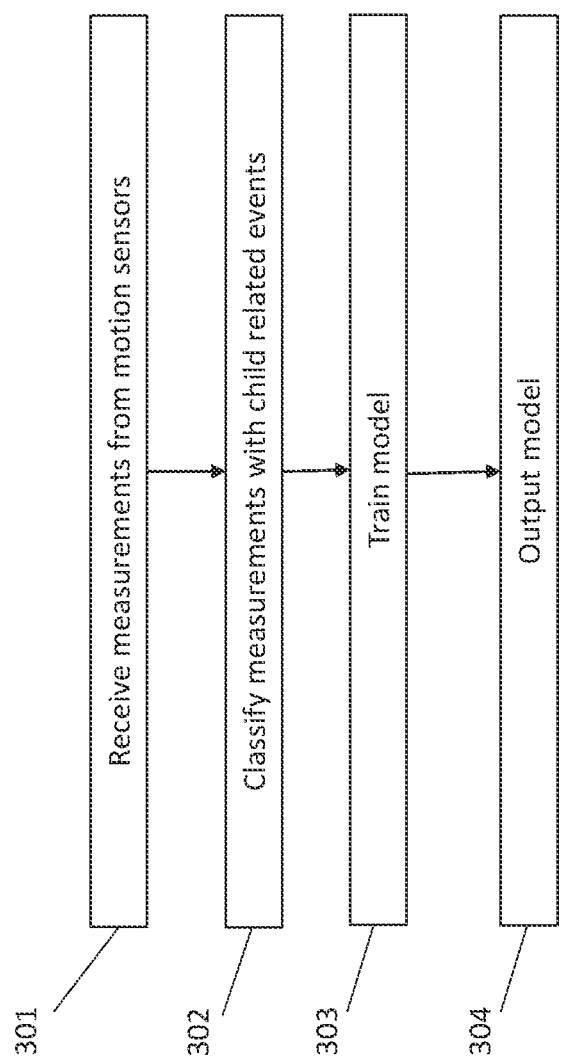
FIG. 3 schematically shows a flowchart of a method of training a model for detecting safety seat events, according to one or more embodiments of the present invention.

Reference is now made to FIG. 3, which is a schematic flowchart of a method of training a model for detecting a safety seat event, in accordance with some embodiments of the present invention. At 301, a dataset or a labeled dataset that includes a plurality of records is received. Each of the records represents measurements of one or more motion sensors 102. The measurements are acquired form the motion sensors, while a vehicle hosting the child safety seat or the base of the child safety seat is on a move. Each of the measurements in the dataset is classified and associated with a child related event.

At 302 the records received from the motion sensors are classified and associated with a child related event. At 303 the on training model 103, is trained with the received records. The on training model is trained to detect a child related event, for instance based on a machine learning paradigm. The on training model is trained to detected and predict a child related event based on new measurements from other motion sensor, while a vehicle hosting the respective child safety seat or base is on a move. An example for a child related event may be the presence or absence of a child in the safety seat, a sleepiness state and an awakeness state of a child a crying child, a relaxed child, an unquite child and an uncomfortable child. Also, in some embodiments of the invention, in an awakeness state of a child in the safety seat the on training model is trained to detect what is the activity level of the child. For example: a calm state of a child is detected as a low level activity and a wild state of a child is detected as a high activity level. In some other embodiments of the invention the model is trained to detect other related child events.

As many seats are installed in a rear facing position, with no line of sight of the driver (usually the parent) to the child, the trained model detects the child status for example: child in a sleepiness state and the protection mechanism unit send a notification to a dedicated cellular phone application that the child is asleep.

Additionally, in some embodiments of the present invention, the on training model learns to detect the driving condition according to the receive measurements. For example, driving condition in an urban environment, highway or field environment or any other driving conditions. In some other embodiments of the invention the on training model is trained to detect an accident situation, based on records received from motion sensors 202, when the vehicle is on a move.

The model learns a threshold of an abnormal acceleration which is not higher than 8G, to identify an accident situation, which does not require a replacement of the safety seat, and learns a threshold of above 8G to identify an accident situation which requires the replacement of the safety seat. The on training model 103 may be implemented using a Convolutional Neural Network architecture (CNN) or a Recurrent Neural Network architecture (RNN).

At 304, the model is outputted to detect an occurrence of child related event based on new measurements, taken by another motion sensor installed on another safety seat or another base of a safety seat.

Figure 4:
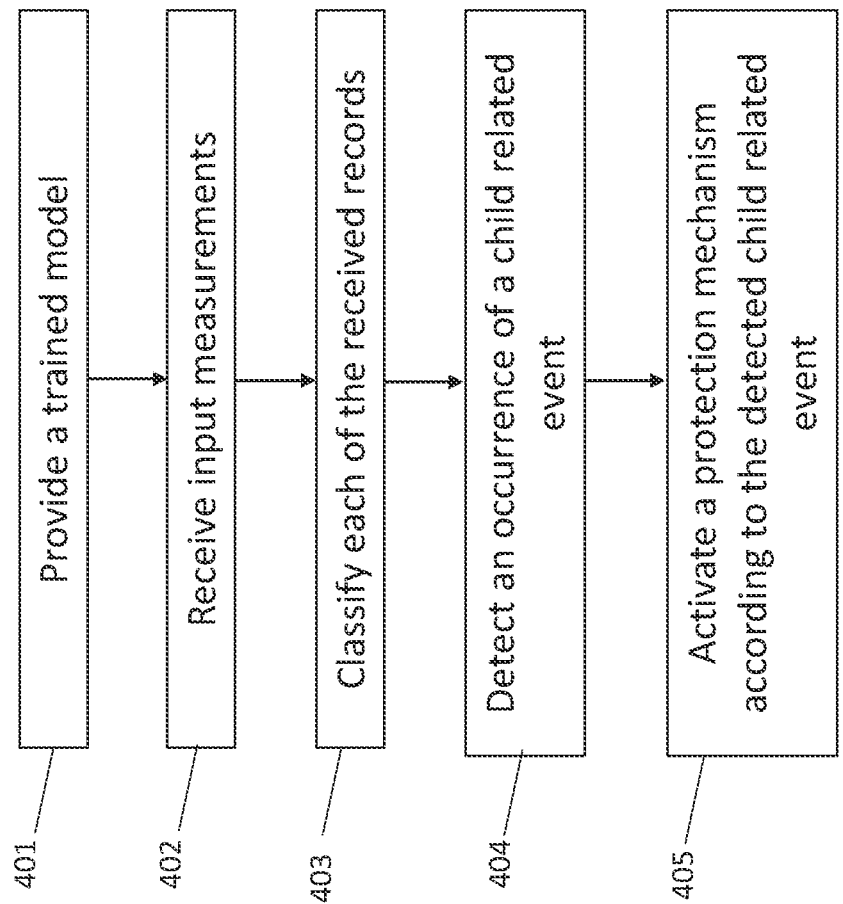
FIG. 4 schematically shows a flowchart of a method for detecting safety seat events, according to one or more embodiments of the present invention.

Reference is now made to FIG. 4, which is a flowchart of a method for detecting safety seat events, according to one or more embodiments of the present application. First, at 401, a trained model 203 for detecting safety seat events is provided. At 202, a plurality of records are received for the trained model 203. Each record represents measurements taken by motion sensors 202. The motion sensor may be an accelerometer and/or a gyroscope or any other motion sensor. At 403, at least one trained model is executed by processors 201, to classify each of the received records, and at 404, an occurrence of a child related event is detected based on the outputs of the execution of the trained model 203. At 405, in accordance with the detected child related event, a protection mechanism is activated by the protection mechanism unit 204, which provides a solution to the detected event.

In some embodiments of the invention the trained model may be implemented using a Convolutional Neural Network architecture (CNN) or a Recurrent Neural Network architecture (RNN).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant models for safety seats will be developed and the scope of the term model for safety seats is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method for generating a model for detecting safety seat events, comprising:
   receiving a plurality of records, each represents measurements taken by one or more motion sensors mounted on a child safety seat or a base of a child safety seat installed in a vehicle while the vehicle is static or in motion, each of the measurements is associated with a child, child seat, or base related event;
   training at least one model with the plurality of records;
   classifying and associating the measurements for the training with driving conditions to detect the driving condition of the vehicle; and
   outputting the at least one model for detecting an occurrence of child related events based on new measurements taken by another motion sensor installed on another child safety seat or another base of another child safety seat, wherein said child related events consist of a presence of a child in the safety seat and a child activity level when said presence is detected.

2. The method of claim 1, wherein each of the measurements is associated with vehicle driving condition measurements of the vehicle while the vehicle is in motion.

3. The method of claim 1, wherein each of the measurements is associated with vehicle driving pattern measurements of the vehicle while the vehicle is in motion, based on detecting patterns in the measurements taken by the motion sensor.

4. The method of claim 1, wherein the driving condition is selected from a group consisting of urban conditions, highway conditions and field conditions.

5. A computer implemented method for executing a model, for detecting safety seat events, comprising:
   receiving a plurality of records, each represents measurements taken by one or more motion sensors mounted on a child safety seat or a base of a child safety seat installed in a vehicle while the vehicle is static or in motion;
   executing at least one model to classify each of the plurality of records, wherein said execution is conducted at least partially on a local processor located on a child safety seat or in a base of the child safety seat;
   detecting an occurrence of a child related event based on outputs of the execution of the at least one model, wherein said child related event consists of a presence of a child in the safety seat and a child activity level when said presence is detected; and
   activating a protection mechanism by a protection mechanism unit according to the detected occurrence of child related event.

6. The method of claim 5, wherein each of the one or more motion sensors is a member of a group consisting of: an accelerometer and a gyroscope.

7. The method of claim 5, further comprising presenting a notification about the occurrence of the child related event while the vehicle is in motion.

8. The method of claim 5, further comprising detecting the driving pattern of the vehicle, based on the one or more motion sensors mounted on the safety seat or the base of the safety seat by detecting patterns in the measurements taken by the one or more motion sensors, and adjusting the protection mechanism to the detected driving pattern according to the detected occurrence of child related event.

9. The method of claim 5, wherein the child activity level is selected from a group consisting of: a sleeping child, an awake child, a crying child, a relaxed child, an unquiet child and an uncomfortable child.

10. The method of claim 5, wherein when the child related event is detected while the vehicle is static for a period longer than a predetermined threshold, an alert indication is activated by the protection mechanism unit.

11. The method of claim 10, wherein the alert indication is a light indication or a sound indication.

12. The method of claim 5, further comprising analyzing an installation process of the safety seat or of the base of the safety seat based on the one or more motion sensors and notifying when the installation is wrong.

13. The method of claim 5, wherein the protection mechanism is selected from a group consisting of: an alert to a driver of the vehicle, an air bag of the vehicle and tighten seat belt of the safety seat.

14. The method of claim 13, wherein when the protection mechanism is the air bag of the vehicle, said air bag is adjusted to a size, weight and age of the child.

15. The method of claim 5, wherein when the safety seat is connected to a cellular phone, a dedicated phone application sends an alert notification to the connected cellular phone, as a text message or as a voice message or as an incoming call.

16. The method of claim 5, wherein the model is using CNN architecture or a RNN architecture.

17. The method of claim 5, further comprising identifying an accident situation according to the model output and notifying the driver of the vehicle of said identified accident situation.

18. The method of claim 17, wherein when an accident situation is identified and the safety seat or the base of the safety seat is connected to a cellular phone, a dedicated phone application sends a notification to the connected cellular phone, about the accident.

19. The method of claim 17, further comprising identifying the safety seat must be replaced, by detecting a separation of at least 2 mm, of two parts of the base of the safety seat, which are linked together by an energy absorption element, and notifying the driver of the vehicle that said safety seat must be replaced.

20. The method of claim 19, wherein the notification to the driver of the vehicle that the safety seat must be replaced is a light or sound indication.

\* \* \* \* \*